Oct. 22, 1968  G. JONES ET AL  3,406,784
PORTABLE HUNTING BLIND
Filed Feb. 25, 1966  2 Sheets-Sheet 1

GLENDALE JONES
TYNER W. LITTLE
INVENTORS

BY *John C. Stahl*

ATTORNEY

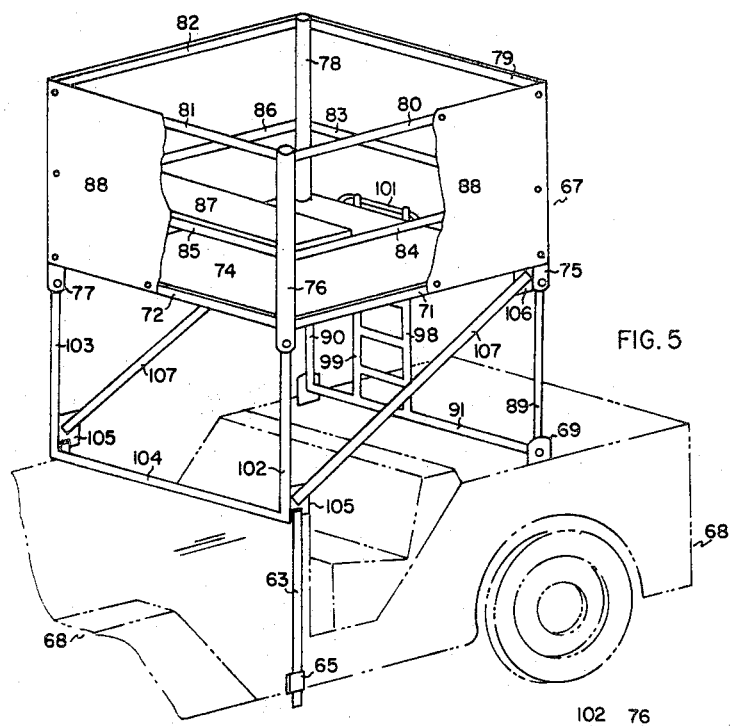

United States Patent Office

3,406,784
Patented Oct. 22, 1968

3,406,784
PORTABLE HUNTING BLIND
Glendale Jones, P.O. Box 98, and Tyner W. Little, P.O.
Box 488, both of Dilley, Tex. 78017
Filed Feb. 25, 1966, Ser. No. 530,221
5 Claims. (Cl. 182—97)

The present invention relates to a portable hunting blind and more particularly to such a hunting blind which is rotatably mounted upon a vehicle.

The primary object of the present invention is to provide a hunting blind which is detachably mounted upon a vehicle wherein such blind is folded down during travel and upon arrival at a selected hunting site may be erected.

Another object is to provide a light weight hunting blind which is mounted upon a vehicle and may be erected or lowered by a single hunter with a minimum of effort.

A further object of the invention is the provision of a hunting blind which is inexpensive to manufacture, capable of mass production techniques, and is universal in its adaptability.

Other objects and features of the invention will become apparent to those skilled in the art as the disclosure is made in the following detailed description of preferred embodiments of the invention as illustrated in the accompanying sheets of drawings in which:

FIG. 5 is a fragmentary, isometric view, partly broken away, of a modification of the invention which is mounted upon a vehicle which does not include a cab, as shown in reference lines.

FIG. 6 is an enlarged rear elevational view, partly broken away, of the embodiment of FIG. 5.

FIG. 7 in a fragmentary, enlarged side elevational view, showing the hunting blind of FIG. 6 collapsed and lowered preparatory to travel.

Figure 1:
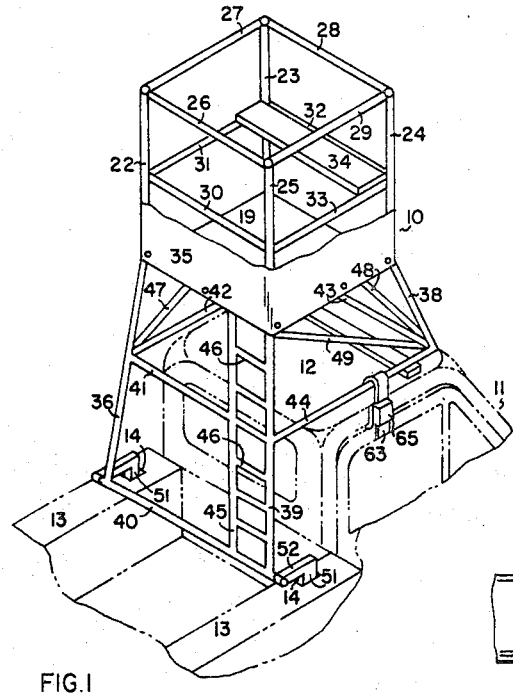
FIG. 1 is an isometric view, partly broken away, showing the preferred embodiment of the subject invention mounted upon a vehicle, shown in reference lines.
Figure 2:
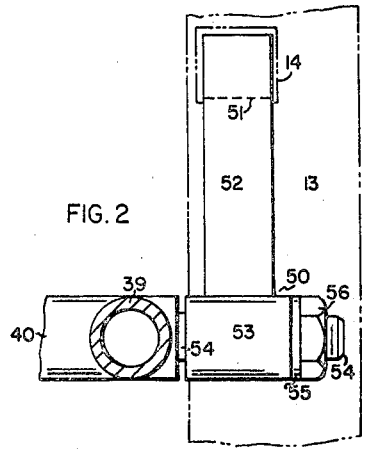
FIG. 2 is a fragmentary, enlarged top plan view, partly broken away and partly in section, of the means for rotatably mounting the preferred embodiment of the invention upon a vehicle.
Figure 3:
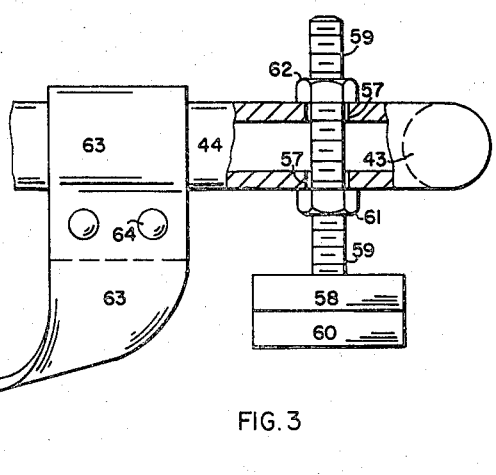
FIG. 3 is a fragmentary, enlarged side elevational view, partly broken away and partly in section, of leveling and securing means utilized in connection with the preferred embodiment of the invention.
Figure 4:
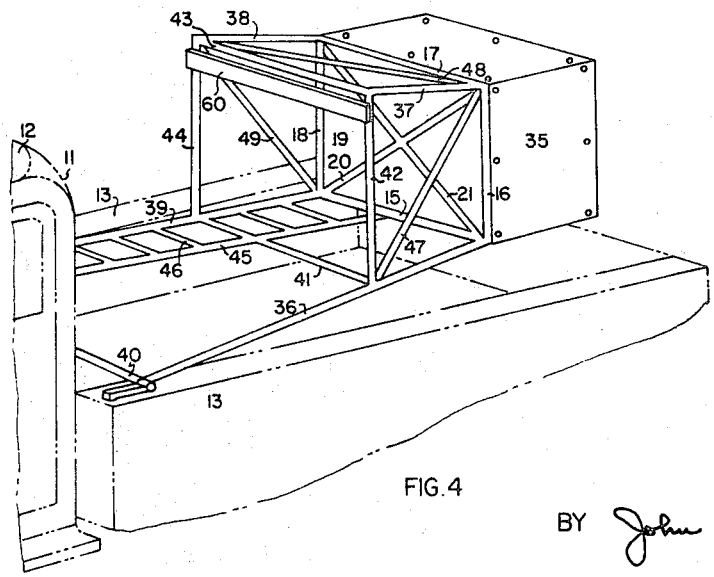
FIG. 4 is an isometric view showing the preferred embodiment of the invention mounted upon a vehicle, illustrated in reference lines, wherein the blind is lowered preparatory to travel.

Referring now to the drawings, wherein like reference characters designate like or corresponding parts throughout the several views, there is shown in FIGS. 1–4, which illustrate a preferred embodiment, an elevated hunting blind 10 which is pivotally mounted upon a vehicle 11 such as a pickup truck or the like, such type vehicle normally includes a cab 12, vertically and rearwardly extending base 13, and a vertically extending pocket 14 in each of the sides 13 in proximity to the cab, which pockets are designed to accommodate a stake rack or sideboards. As best seen in FIG. 1 of the drawings, hunting blind 10 is mounted rearwardly of the cab 12 and in raised condition extends substantially vertically above the cab; when the hunting blind 10 is lowered preparatory to travel, as illustrated in FIG. 4, portions of the said blind are normally supported by the tailgate and extend rearwardly of the vehicle.

More specifically, blind 10 comprises an essentially rectangular, integrally formed base framework consisting of members 15–18 (see FIG. 4) which support the outer edges of a base panel or floor 19 in a conventional manner; a pair of diagonally extending crossed members 20–21 provide additional support for floor 19 and the base framework. As viewed in FIG. 1, standards 22–25 are secured to the corners of such base framework, the longitudinal axes of the said standards are preferably perpendicular to the plane of floor 19. Members 26–29 comprise a top framework and are secured to the ends of the respective standards. In like manner, an intermediate framework consists of members 30–33, the lateral ends of which are secured to the adjacent standards; a seat 34 is conventionally secured to members 31–33. A weather resistant covering 35, such as waterproofed canvas or the like, is detachably secured to base members 15–18, standards 22–25, and top frame members 26–29, respectively, as by snap fasteners or the like.

There is shown in FIGS. 1 and 4 of the drawings downwardly depending support members 36–39 which connect to the respective corners of the base framework heretofore described. More specifically, support members 36, 39 terminate upwardly by connecting to the ends of members 15, the said members 36, 39 diverge and extend rearwardly with the lower ends secured in proximity to the outermost ends of a horizontally and transversely extending hollow cylindrical member 40; preferably the member 40 is of lesser length than the distance between transversely aligned pockets 14 in opposite sides of the vehicle.

When the blind is in raised condition, an essentially rectangular frame consisting of members 41–44 extends slightly above the roof of the cab with member 41 secured laterally to support members 36, 39 approximately medially between and parallel to members 15 and 40, respectively. Support members 37, 38 heretofore mentioned diverge and extend forwardly with the lower ends thereof secured to the lateral ends of member 43. Member 45 parallels support member 39 and is secured to members 15, 41 and 40, respectively, with a plurality of spaced rungs 46 conventionally secured to members 39 and 45 whereby the hunter may gain access to the hunting blind thus formed.

If desired, additional bracing or supports may be provided; for example, brace 47 connects at one end to the junction of members 41, 42 and at the other end to the junction of members 16, 17; brace 48 connects to the junction of members 16, 17 and members 43, 44 while brace 49 connects to the junction of members 15, 18 and 43, 44.

Referring now to FIG. 2 of the drawings, there is shown an L-shaped bracket 50 whereby the hunting blind 10 may be detachably and pivotally mounted upon vehicle 11. More specifically, the vertically extending leg 51 (see FIG. 1) of such bracket 50 extends downwardly into pocket 14 in the side of the vehicle with the horizontally extending leg 52 integrally formed therewith and extending rearwardly along the upper surface of each side; a transversely aligned sleeve 53 is welded or otherwise secured to the rearmost end of leg 52. The hollow cylindrical member 40 is aligned with sleeve 53 and an elongated rod 54 which is threaded on each end passed through the aligned bores with a washer 55 and lock nut 56 threaded thereon outwardly of sleeve 53. It is understood that a cotter pin passed through a transversely extending bore in the outermost end of the rod may also be utilized.

There is shown in FIG. 3 of the drawings means whereby the foremost end of the hunting blind 10 is supported by the cab of the vehicle and the floor 19 may be leveled. More specifically, a vertically extending bore 57 is provided in members 42, 44 rearwardly of member 43. A laterally extending plate 58, preferably of metal, includes an upstanding stud 59 and a pad 60 conventionally secured thereto. Nut 61 is threaded onto stud 59, the said stud is passed through bore 57 with a nut 62 threading thereon and abutting the upper surface of member 44. The opposite end of plate 58 is constructed in like manner and is adjustably connected to member 42. Pad 60 may be adjusted by means of nuts 61, 62 to bear against the roof of the cab thereby providing uniform support for the blind 10 and also leveling floor 19. It is understood that plate 58 may be slightly curved to conform with the curvature of the roof of the cab of the vehicle; alternatively, circular pads secured to members 42, 44 in the manner heretofore described may be utilized.

When the blind is raised, as shown in FIG. 1, the said blind is preferably secured to the vehicle to prevent the same from pivoting backward when the hunter climbs the ladder or moves about in the blind. One end of an elongated strap 63 (see FIG. 3) is looped over each of the members 42, 44 and secured thereto by means of rivets 64 or other fastening means which pass through the free end of said strap downwardly of the respective members. A conventional buckle 65 carried on the said strap 63 includes an upwardly opening hook 66 conventionally secured to the rear surface of said buckle. The said strap may be slidably adjusted along the members 42, 44 and the hook 66 inserted under the weather molding, side steps or other supporting structure of the vehicle. The blind is drawn firmly against the top of the cab and secured to the vehicle by means of a downward force on the free end of strap 63; to loosen the blind preparatory to travel, the buckle is pulled downward thereby disengaging hook 66.

In FIGS. 5-7 of the drawings there is shown a modification of the invention wherein hunting blind 67 is pivotally mounted on a vehicle 68 such as a "Jeep" or the like, which type vehicle does not normally include a cab or hard top. The vehicle 68 is modified to include an upstanding lug 69 on each side of the vehicle rearwardly of the driver's seat to which the hunting blind 67 is pivotally connected. In such modification, blind 67 is preferably telescoped and rotated clockwise when not in use, is supported by the tailgate, and does not extend substantially beyond the rear of the said vehicle.

Blind 67 includes a base framework consisting of members 70-73 (member 73 not shown) which support the outer edges of floor 74; standards 75-78 connect to the respective corners of the said base framework and terminate downwardly thereof; members 79-82 which comprise a top framework are secured to the upper ends of the said standards. Members 83-86 comprising an intermediate framework connect at each end to the adjacent standards with a seat 87 conventionally secured to members 84-86. A weather resistant covering 88, preferably of canvas, is detachably secured to the base members 70-73, standards 75-78, and top frame members 79-82 as by snap fasteners or the like.

Referring now to FIGS. 5 and 6 of the drawings, there is shown a U-shaped frame consisting of legs 89-90 which are secured downwardly to a hollow, cylindrical base 91. Legs 89, 90 telescope into standards 75, 78 respectively and in both raised and lowered conditions are secured therein by means of a pin 92 passing through aligned bores in such parts within a washer 93 and cotter pin 94 passed through a transversely extending bore (not shown) in the end of pin 92. As best seen in FIG. 6, a rod 95 passes through base 91 and a horizontally extending bore (not shown) in lug 69 and is secured outwardly of the lug on each side of the vehicle by means of a washer 96 and cotter pin 97 passing therethrough. Access to the said blind is provided by means of a ladder consisting of vertically extending members 98-99 spaced inwardly of standard 90 which are secured downwardly to the base 91 with a plurality of spaced rungs 100 connected at each end to members 98, 99. An elongated band 101 is secured at each end to member 70, the said band passes outwardly of the upper portions of the ladder as best seen in FIG. 5 of the drawings, not only securing the upper end of the ladder but also guiding the ladder upwardly behind covering 88 when the blind 67 is lowered.

The foremost end of the blind normally extends over the hood of the vehicle and is supported by means of a U-shaped frame consisting of legs 102-103 which terminate downwardly in a horizontally extending base 104. Legs 102, 103 telescope into standards 76, 77 respectively and are secured therein both in raised and lowered condition by means of pins 92 passing through aligned bores in the respective parts in the manner heretofore described. As shown in FIG. 5, base 104 abuts the hood of the vehicle 68 or the windshield of the vehicle when turned downwardly over the hood.

Additional bracing and supports may be utilized with the blind thus formed; for example, a vertically aligned and rearwardly extending gusset 105 is secured to the lower end of legs 102, 103 on the front of the blind while a vertically aligned and forwardly extending gusset 106 is provided in the angle between standards 75, 78 and members 71, 73 respectively. Diagonally extending braces 107 may be detachably connected to such gussets 105, 106 in a manner well known in the art.

To additionally secure the hunting blind 67 to the vehicle 68 the securing means heretofore described in detail in connection with FIG. 3 of the drawings may be utilized; more particularly, the free end of strap 63 is passed through an elongated slot 108 (see FIG. 7) and conventionally secured. The hook 66 may then be passed under any portion of the body of the vehicle and secured in the manner heretofore described.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. In combination with a vehicle having a cab, a hunting blind pivotally mounted on said vehicle rearwardly of said cab and arranged to extend upwardly and over the cab of said vehicle and horizontally, a plurality of elongated upright supports, two of said supports positioned rearwardly of the cab, said two supports connected downwardly to a transversely and horizontally extending member, means pivotally connected to said horizontally extending member and said vehicle whereby said hunting blind pivots about such axis, a frame secured to the upper ends of said supports, a covering secured to said frame and enclosing the sides thereof, adjustable means bearing against the cab to level and support the blind, and means providing access to said hunting blind.

2. In combination with a vehicle having a cab and pockets in the sides thereof rearwardly of the cab, a hunting blind pivotally mounted on said vehicle and arranged to extend over the cab of said vehicle and horizontally, a plurality of elongated upright supports, two of said plurality of supports positioned rearwardly of said cab, said two supports connected adjacent their lower ends to a transversely and horizontally extending tubular member, a pair of L-shaped brackets each consisting of a vertical arm and a horizontal arm, the vertical arm of each bracket inserted into a pocket, a transversely extending sleeve secured to each horizontally extending arm, a rod passed through said tubular member and said sleeve and secured on each side of the vehicle outwardly of said sleeve, a frame secured to the upper ends of said supports, a covering secured to said frame and enclosing the sides thereof, adjustable means bearing against the cab to level and support the blind, and means providing access to said hunting blind.

3. The invention of claim 2 including cross bracing extending between adjacent supports on the sides and front of the blind.

4. The invention of claim 2 including means to detchably secure the blind when in raised condition to the vehicle.

5. In combination with a vehicle having a driver's seat spaced rearwardly of the front end thereof, spaced and transversely aligned connecting means secured to said vehicle rearwardly of the driver's seat, a hunting blind comprising a platform, a plurality of standards secured to said platform, a covering secured to said standards, a first U-shaped frame consisting of a tubular base and perpendicularly extending legs, said legs telescoping into adjacent standards rearwardly of the driver's seat, a rod passing through said tubular base and said connecting means and detachably secured outwardly of said connecting means, a second U-shaped frame consisting of a base and perpendicularly extending legs, said legs telescoping into adjacent standards forwardly of the driver's seat, said base of said second frame bearing against the vehicle, means releasably maintaining the said legs in each respective standard, and means providing access to the hunting blind.

References Cited

UNITED STATES PATENTS

| | | | |
|---|---|---|---|
| 1,960,588 | 5/1934 | Jorgensen | 182—127 |
| 2,245,481 | 6/1941 | Kiley et al. | 182—127 |
| 2,854,705 | 10/1958 | McClaran | 43—1 |
| 3,289,787 | 12/1966 | McSwain | 182—20 |

BENJAMIN HERSH, *Primary Examiner.*

J. A. PEKAR, *Assistant Examiner.*